UNITED STATES PATENT OFFICE.

ALBERT THIELE, OF TICKFAW, ASSIGNOR OF ONE-HALF HIS RIGHT TO LOUIS SCHORMANN, OF NEW ORLEANS, LOUISIANA.

IMPROVEMENT IN PAVING COMPOSITIONS.

Specification forming part of Letters Patent No. 142,594, dated September 9, 1873; application filed May 14, 1873.

*To all whom it may concern:*

Be it known that I, ALBERT THIELE, of the town of Tickfaw, in the parish of Tangipahoa, State of Louisiana, have invented a new, useful, and Improved Composition Pavement; and I hereby declare the following to be a full, clear, and correct enumeration of the materials of which it is composed, the relative proportions of each, their mixture, and mode of application.

My improved composition pavement, consisting of materials hereinafter described, is designed to be used as a cheap substitute for blue-stone or other stone flagging for streets, banquettes, floors for dwellings, stores, warehouses, or other buildings, for walks and roads in public or private parks, and for all or nearly all purposes for which stone flagging is at present employed. My said composition material, designed for the purposes above enumerated, consists of about four hundred parts of a species of bituminous clay or asphaltic clay, which is found in large quantities in the said parish of Tangipahoa, combined with fifteen parts of coal-tar, ten parts of rosin, twenty parts of chalk, forty parts of gravel, and sixty parts of clear, sharp sand. The above named ingredients are well mixed together, and then thoroughly dried, either in the open air in the sun, or by heat in a kettle over a fire or furnace, or in any other manner found most convenient and suitable. The application of heat must then be continued until all the asphaltic or tarry substance existing in the clay, as well as that of the rosin, which is mixed therewith, is thoroughly melted and combined by stirring with the other ingredients added.

The material, prepared as above, is ready for use, and may be applied in the usual way of applying cement or lime mortar for floors, or for the purpose above mentioned.

Having described my invention, what I desire to secure by Letters Patent is the following:

The improved composition pavement, composed of the ingredients and about in the proportions stated, for the purposes set forth.

A. THIELE.

Witnesses:
H. N. JENKINS,
L. J. OLMSTEAD.